United States Patent [19]

Sakamoto

[11] Patent Number: 5,504,554
[45] Date of Patent: Apr. 2, 1996

[54] AUTOMATIC LIGHT EMISSION CONTROL SYSTEM FOR ELECTRONIC FLASH

[75] Inventor: Hiroshi Sakamoto, Kanagawa, Japan

[73] Assignee: Nikon Corporation, Tokyo, Japan

[21] Appl. No.: 162,917

[22] Filed: Dec. 8, 1993

[30] Foreign Application Priority Data

Dec. 8, 1992 [JP] Japan ..................... 4-351383

[51] Int. Cl.⁶ .............................. G03B 7/00; G03B 15/05
[52] U.S. Cl. ................................................... 354/416
[58] Field of Search .................... 354/413, 416, 354/417

[56] References Cited

U.S. PATENT DOCUMENTS 4,457,602  7/1984  Mizokami ................. 354/416
4,951,080  8/1990  Sakamoto et al. .......... 354/416 X

*Primary Examiner*—Howard B. Blankenship

[57] ABSTRACT

An automatic light emission control system separately compensates the flashlight emission of each of a plurality of electronic flashes. A camera generates a first signal in synchronism with the opening of a shutter and generates a second signal when a TTL measured value of the reflected light from an object reaches a reference exposure set lower than a correct exposure. Each electronic flash connected to the camera includes an electronic flash unit, a photometry circuit for measuring its flashlight emission, and a compensation signal adjuster. The flashlight emission of the flash unit is initiated in response to the first signal and interrupted in response to the interrupt signal generated when an integrated emission amount measured by the photometry circuit reaches a desired flashlight emission amount determined in accordance with an intergrated emission amount measured up to the arrival of the second signal and the compensation signal amount.

13 Claims, 3 Drawing Sheets

AUTOMATIC LIGHT EMISSION CONTROL SYSTEM FOR ELECTRONIC FLASH

BACKGROUND OF THE INVENTION

1. Field of the Invention

The present invention relates to an automatic light emission control system for electronic flashes, and more particularly the invention relates to a system for controlling the initiation and interruption of flashlight emission of an electronic flash connected to a camera having a TTL autoflash control function.

2. Description of the Prior Art

Automatic light emission control systems for electronic flashes heretofore known as TTL auto flashes have been designed so that after the flashlight emission of an electronic flash has been initiated in response to the shutter opening operation of a camera, the reflected light of the flashlight impinging on an object to be photographed is measured through the taking lens of the camera as the amount of light at the position of a film surface so that when the integrated value of the light amount obtained by the light measurement reaches a preset exposure discrimination level corresponding to the correct exposure, an emission interrupt signal is transmitted from the camera to the electronic flash and thus the flashlight emission of the electronic flash is interrupted immediately.

Where such a conventional system is used to control a plurality of electronic flashes, in order to obtain the desired relative emission amounts for the individual electronic flashes, the usual practice is to adopt such complicated method as causing the distances between the respective electronic flashes and an object to be photographed to differ from one .another or providing selected one or more of the electronic flashes with filters to decrease the amounts of flashlight emission thereof and these methods also have the disadvantage of being subjected to restrictions with respect to the photographing space, the kinds of filters, etc.

On the other hand, U.S. Pat. No. 4,457,602 (Mizokami), for example, discloses a multiple light emission control system utilizing a plurality of electronic flashes and in this system the amounts of flashlight emission from the individual electronic flashes can be compensated separately under the TTL autoflash control as desired by a photographer. The principle of this control is such that in the TTL photometry circuit of the camera the relative relation between the integrated value of measured light amount and the exposure discrimination level is set separately for each of the electronic flashes to differ from one another and thereby to provide the electronic flashes with separate compensation amounts which are different from one another so that as for example, the gain of the TTL photometry circuit can be increased for selected one of the electronic flashes to compensate its amount of flashlight emission so as to keep it on the underexposure side or alternatively the exposure discrimination level can be shifted in the measured light amount integrating direction to compensate the amount of flashlight emission so as to keep it on the overexposure side.

With this multiple light emission control system, however, a plurality of exposure discrimination level signals of different values relative to one another are respectively sent to the plurality of electronic flashes from the camera and therefore a plurality of signal output terminals corresponding to the number of electronic flashes to be connected must be provided on the camera side. Thus, this multiple light emission control system cannot be used with cameras other than those of special constructions having such preparations. This system is also disadvantageous in that of the plurality of electronic flashes the one whose flashlight emission is to be interrupted later is increased in the amount of flashlight emission by a light amount corresponding to the unemitted light amount of that electronic flash whose flashlight emission has been precedently interrupted, thus failing to produce a total amount of flashlight emission intended by a photographer.

SUMMARY OF THE INVENTION

It is the primary object of the present invention to provide an automatic light emission control system for electronic flashes which overcomes the foregoing deficiencies in the prior art and which is so designed that where a multiple flashlight photography is effected by utilizing a camera having the ordinary TTL autoflash control function, the amounts of flashlight emission from a plurality of electronic flashes can be compensated independently of one another and the desired relative flashlight emission amounts as intended by a photographer can be easily set.

In accordance with a basic aspect of the present invention there is thus provided an automatic light emission control system for controlling the operation of at least one electronic flash connected to a camera, the system including sync signal generator means for generating a first signal substantially synchronized with the opening of a shutter of the camera; first measuring means for generating a first measurement signal corresponding to the amount of reflected light from an object to be photographed which is illuminated by the flashlight emission from the electronic flash; reference signal generator means for generating a reference signal corresponding to a predetermined reference exposure; first comparator means for comparing the first measurement signal and the reference signal to generate a second signal when the amount of reflected light reaches the reference exposure; second measuring means for generating a second measurement signal corresponding to the amount of flashlight emission from the electronic flash; compensation signal generator means for generating a compensation signal corresponding to a predetermined compensation light amount for the amount of flashlight emission from the electronic flash; means for determining a desired flashlight emission amount of the electronic flash in accordance with the compensation light amount given by the compensation signal and the integrated amount of the second measurement signal obtained during the interval between the first time point of generation of the first signal and the second time point of generation of the second signal; second comparator means for generating a third signal when the integrated value of the second measurement signal integrated from the first time point reaches the desired flashlight emission amount; and control means for initiating the flashlight emission of the electronic flash in response to the generation of the first signal and for interrupting the flashlight emission from the electronic flash in response to the generation of the third signal.

Preferably, the reference signal generator means generates the reference signal corresponding to the reference exposure set lower than the desired correct exposure of the object to be photographed, and the first comparator means generates the second signal prior to the amount of reflected light reaching the desired correct exposure.

In accordance with a preferred embodiment, the automatic light emission control system further includes photometric level compensation means for compensating the gain of the first measuring means in such a manner that the first comparator means generates the second signal before the measured light amount of the first measuring means reaches the desired correct exposure of the object to be photographed.

In accordance with another preferred embodiment, the automatic light emission control system further includes signal selector means for selectively applying one or the other of the second and third signals to the control means whereby in response to the reception of the second signal or the third signal selected by the signal selector means the control means interrupts the flashlight emission of the electronic flash.

In accordance with another aspect of the present invention, there is provided an automatic light emission control system for controlling the operation of at least one electronic flash connected to a camera, the system including: sync signal generator means for generating a first signal substantially synchronized with the opening of a shutter of the camera; first measuring means responsive to the shutter opening operation of the camera to measure the amount of reflected light from the object to be photographed by the camera through a lens thereof; reference signal generator means storing a plurality of preset reference exposures which are different from one another and lower than a desired correct exposure value for the object to generate a signal corresponding to selected one of the reference exposures; comparator means for generating a second signal when the reflected light amount measured by the first measuring means reaches the reference exposure selected by the reference signal generator means; second measuring means for measuring the amount of flashlight emission of the electronic flash; compensation signal generator means for generating a compensation signal corresponding to a predetermined compensation light amount with respect to the amount of flashlight emission of the electronic flash; means for generating a third signal when the integrated value of the flashlight emission amount measured by the second measuring means from the time point of generation of the first signal reaches a desired flashlight emission amount determined in accordance with the integrated value of the flashlight emission amount measured by the second measuring means during the time interval between the generation of the first signal and the generation of the second signal and the compensation light amount; and control means for initiating the flashlight emission of the electronic flash in response to the generation of the first signal and for interrupting the flashlight emission of the electronic flash in response to the generation of the third signal.

In accordance with still another aspect of the present invention there is provided an electronic flash adapted to be connected to a camera having a TTL autoflash control function. This camera can be utilized irrespection of its type provided that it generates a first signal in synchronism with the opening of its shutter and it generates a second signal when the measured value of the amount of reflected light from an object to be photographed reaches a predetermined exposure. The electronic flash according to this aspect, which is to be connected to such type of camera, includes flashlight emission means adapted to be electronically controlled to initiate and interrupt its flashlight emission; measuring means for measuring the amount of flashlight emission from the flashlight emission means; compensation amount setting adjuster means for setting a compensation light amount for the flashlight emission amount of the flashlight emission means; means for generating a third signal when the integrated value of the flashlight emission amount measured by the measuring means from the time of arrival of the first signal reaches a desired flashlight emission amount determined in accordance with the integrated value of the flashlight emission amount measured by the measuring means during the time interval between the arrival of the first signal and the arrival of the second signal and the compensation light amount set in the compensation amount setting adjuster means; and control means for initiating the flashlight emission of the flashlight emission means in response to the arrival of the first signal and for interrupting the flashlight emission of the flashlight emission means in response to the generation of the third signal.

In accordance with a preferred embodiment, the electronic flash further includes signal selector means for selectively applying one or the other of the second and third signals to the control means, and in this case the control means interrupts the flashlight emission of the flashlight emission means in response to the receipt of the second signal or the third signal selected by the signal selector means.

In accordance with another embodiment, the electronic flash includes the terminals required for delivering to the outside the first and second signals supplied from the camera so as to connect any other additional electronic flash.

In accordance with still another aspect of the present invention there is provided such electronic flash adapted to be connected to a camera of the type having the TTL autoflash control function, and the electronic flash includes an electronic flash unit adapted to be electronically controlled to initiate and interrupt its flashlight emission; a controller for initiating the flashlight emission of the electronic flash unit in response to the reception of the first signal and for interrupting the flashlight emission of the electronic flash unit in response to the reception of an interrupt signal; a photometer for measuring the flashlight emission amount from the electronic flash unit; a compensation signal setting adjuster for setting a compensation light amount for the flashlight emission amount of the electronic flash unit; and an interrupt signal generator circuit for applying the interrupt signal to the controller when the integrated value of the flashlight emission amount measured by the photometer from the first time point of the arrival of the first signal reaches a desired flashlight emission amount determined in accordance with the integrated value of the flashlight emission amount measured during the interval between the first time point and a second time point of the arrival of the second signal and the compensation light amount set in the compensation signal setting adjuster.

In accordance with a preferred embodiment, the interrupt signal generator circuit includes a counter for counting the integrated value of the flashlight emission amount measured by the photometer from the first time point of the arrival of the first signal; a register for reading the integrated value of the flashlight emission amount stored in the counter during the interval between the first time point and the second time point of the arrival of the second signal and the compensation light amount set in the compensation signal setting adjuster to store a desired flashlight emission amount value corresponding to the sum of the received integrated value and compensation light amount value; and a comparator for generating the interrupt signal when the integrated value of the flashlight emission amount stored in the counter from the first time point reaches the desired flashlight emission amount value stored in the register.

With the automatic light emission control system for electronic flashes according to the present invention, the sync signal generator circuit generates a first signal synchronized with the shutter opening operation of a camera and thus the flashlight emission of the electronic flash is initiated through the control means. The first measuring means measures the amount of reflected light from an object to be photographed illuminated by the flashlight emission of the electronic flash with a gain corresponding to the photographic sensitivity determined for example by the film speed. The resulting integrated value of the measured light amount is compared with a predetermined reference exposure in the first comparator means so that a second signal is generated from the comparator means when the measured light amount by the first measuring means coincides with the reference exposure generated from the reference signal generator means.

On the other hand, the second measuring means measures the flashlight emission amount of the electronic flash without the intermediary of the object to be photographed. In accordance with the flashlight emission amount from the electronic flash measured by the second measuring means during the time interval between the generation of the first signal and the generation of the second signal and the predetermined compensation light amount from the compensation signal generator means, an ultimate desired flashlight emission amount from the electronic flash is determined by digital circuit means including for example a counter, a register, etc.

With the system according to the present invention, if, for example, a reference exposure for discriminating the TTL autoflash control of a camera is set on the underexposure side by an amount corresponding for example to 2 graduations in terms of an aperture scale value as compared with the value required for providing the correct exposure, that is, if an exposure compensation dial is set to "–2", a second signal is supplied to the electronic flash when the first measuring means measures an integrated light amount equal to the reference exposure.

The amount of flashlight emission of the electronic flash from the time point of the generation of the first signal is continuously measured by the second measuring means so that a desired flashlight emission amount from the electronic flash is determined in accordance with the integrated value of the amount of flashlight emission measured up to the time of the generation of the second signal and the desired compensation light amount set in the compensation signal generator means.

In addition, when the integrated value of the light amount measured by the second measuring means from the time of the generation of the first signal reaches the desired flashlight emission amount, a third signal as the interrupt signal is generated from the second comparator means. The flashlight emission of the electronic flash is interrupted by the control means as soon as the third signal is generated.

In this way, even after the second signal has been generated, the flashlight emission of the electronic flash is continued until it reaches the desired flashlight emission amount thereby obtaining the desired exposure determined by the compensation light amount.

As a result, where a plurality of electronic flashes are used to effect the multiple flashlight photography, the desired compensation light amounts of the individual electronic flashes can be set independently of one another and moreover all the electronic flashes can be controlled by means of the common first and second signals. In this case, after the result of the measurement made by the first measuring means for the TTL autoflash control has reached a certain given reference exposure, each of the electronic flashes can be separately caused to continue its flashlight emission up to the desired flashlight emission amount set specifically for itself and therefore relative emission amounts corresponding considerably accurately to the intended flash exposure of a photographer can be set for the plurality of electronic flashes.

While, in the present invention, the discrimination level of the TTL autoflash control is determined by setting the reference exposure to a value lower than the correct exposure value as mentioned previously, the discrimination level can be determined by other method of compensating the gain of the first measuring means. In this case, even if the reference exposure for generating the second signal has been set to a value corresponding to the correct exposure as in the case of the conventional TTL autoflash photography, the first comparator means can be caused to generate a second signal before the integrated value of the measured light amount by the first measuring means reaches a light amount corresponding to the correct exposure.

Further, in accordance with the automatic light emission control system of the present invention the signal selector means applies a second signal in place of a third signal to the control means and thus the flashlight emission of the electronic flash is interrupted at the time of the generation of the second signal, thereby making it possible to cope with the situation in all the same manner as in the conventional case where a single electronic flash is used or where a plurality of electronic flashes are used with a uniform flashlight emission amount.

In accordance with the present invention, it is possible to separately compensate the flashlight emission amount of a plurality of electronic flashes connected to a camera having the TTL autoflash control function. The camera having the TTL autoflash control function generates a first signal in synchronism with the opening of its shutter and it generates a second signal when the TTL measured value of the amount of reflected light from an object to be photographed reaches a reference exposure preset lower than the correct exposure. In each of the electronic flashes connected to the camera, the flashlight emission of an electronic flash unit is initiated in response to the reception of the first signal from the camera and the flashlight emission of the electronic flash unit is interrupted in response to the generation of an internal interrupt signal. The interrupt signal for interrupting the flashlight emission of the electronic flash unit is generated when the integrated value of the flashlight emission amount measured by the photometer from the time of the arrival of the first signal from the camera reaches a desired flashlight emission amount determined in accordance with the integrated value of the flashlight emission amount measured up to the arrival of the second signal from the camera and the compensation light amount.

Where a plurality of electronic flashes of the above construction according to the present invention are connected to a camera having the TTL autoflash control function, each of the electronic flashes merely receives in common the first and second signals from the camera to perform its flashlight emission operation with an individually set flashlight emission amount. Thus, where the camera is provided with a single set of TTL autoflash signal or sync signal terminals for outputting the first and second signals, each electronic flash is provided with input terminals for receiving the first and second signals and auxiliary output terminals for transmitting the received first and second signals to the other electronic flash. Of the plurality of electronic flashes each having such auxiliary output terminals, the first one has its input terminal connected to the sync signal terminal of the camera. Each of the other one or more electronic flashes has its input terminals connected to the auxiliary output terminals of the other electronic flash. As a result, the user is required only to buy an additional electronic flash or flashes each having the similar auxiliary output terminals so that there is no need to make modifications on the camera and it is possible to perform the multiple autoflash photography employing the desired number of electronic flashes.

Above and other objects, features and advantages of the present invention will become more apparent from the following description of its some preferred embodiments shown for illustrative purposes only without any intention of limitation when taken in conjunction with the accompanying drawings.

DESCRIPTION OF THE PREFERRED EMBODIMENTS

Figure 1:
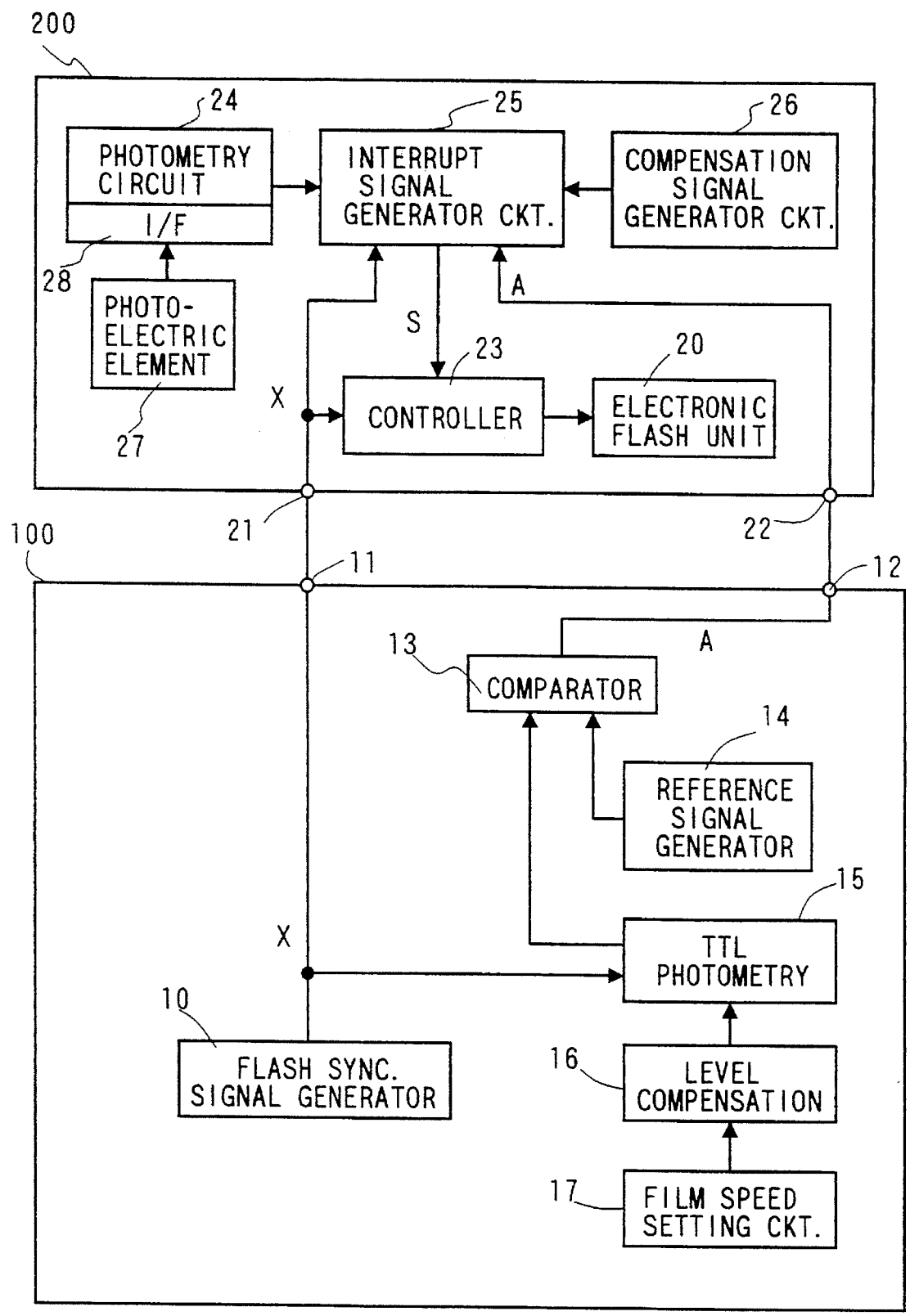
FIG. 1 is a block diagram showing the construction of principal parts of an automatic light emission control system for electronic flash according to an embodiment of the present invention.

FIG. 1 shows the construction of principal parts of an automatic light emission control system for electronic flash according to an embodiment of the present invention, and the portions having less direct bearing on the present invention, e.g., the phototaking system of the camera are not shown for purposes of simplifying the description.

The system is mainly composed of a camera 100 having the TTL autoflash control function and an electronic flash 200 connected to the former.

In the camera 100, a sync signal generator circuit 10 generates a sync signal (first signal) X in synchronism with the full opening of the front curtain of the focal-plane shutter, and the sync signal X is transmitted to the electronic flash 200 through an output terminal 11. A TTL photometry circuit 15 is designed so that the amount of the reflected light from an object to be photographed illuminated by the flashlight emission from the electronic flash 200 is measured and integrated as the light amount at the film surface position through the taking lens (not shown) of the camera 100.

A plurality of reference exposures as exposure discrimination levels for the measured output of the TTL photometry circuit 15 can be selectively set as a number of degrees for the aperture scale value, such as, ± 0, −1, −2, that is, as a representation of exposure value EV in a reference signal generator 14. In other words, this reference exposure value is set as a scale factor for the compensation initiating flashlight emission amount of an electronic flash which is intended by a photographer with respect to the correct exposure corresponding to the film speed of the film used with the camera and the aperture scale value set in the camera.

When any of the flashlight emission scale factors is selectively set, the reference signal generator 14 generates a reference signal corresponding to the thus set reference exposure in the form for example of digital data. A first comparator 13 outputs an external interrupt signal (second signal) A to the electronic flash 200 from an output terminal 12 when the integrated value of the measured light amount obtained from the TTL photometry circuit 15 reaches the value of the reference signal applied from the reference signal generator 14.

In the present embodiment, the camera 100 further includes a photometric level compensation circuit 16 for compensating the gain of the TTL photometry circuit 15 and a film speed setting circuit 17 for providing the TTL photometry circuit 15 with a measuring gain corresponding to the film speed used.

While, in FIG. 1, the sync signal X appears at the output terminal 11 and the interrupt signal A appears at the output terminal 12, as is well known in the art, these output terminals 11 and 12 are arranged in the hot shoe or the synchro socket (not shown) provided in the camera body for the attachment of the electronic flash.

On the other hand, in the electronic flash 200 an electronic flash unit 20, which is electronically controllable to initiate and interrupt its flashlight emission, is formed by a Xenon discharge tube of the coventionally well known type and its drive circuit. The amount of the flashlight from the electronic flash unit 20 is measured directly or not through an object to be photographed by a photometry circuit 24 incorporated in the electronic flash 200. The photometry circuit 24 includes a photoelectric element 27 and a current-frequency conversion circuit (I/F conversion circuit) 28 for converting the photocurrent from the photoelectric element 27 to pulse signals of a frequency corresponding to the photocurrent. The photoelectric element 27 is arranged in the vicinity of the Xenon discharge tube (not shown) of the electronic flash unit 20 and it receives the flashlight discharged from the Xenon discharge tube, thereby producing a current output proportional to the received light amount. As a result, by counting the number of pulses generated from the I/F conversion circuit 28 of the photometry circuit 24 over a certain period of time, it is possible to know an integrated value of the flashlight emission amount from the Xenon discharge tube.

The electronic flash 200 further includes a compensation signal generator circuit 26 for setting the compensation amount of its flashlight emission to the desired value and compensation light amounts are also selectively settable as the numbers of degrees or steps for the aperture scale value, such as, ±0, −1 and −2, that is, a representation of exposure value EV. In other words, such compensation light amount is set as a light amount scale factor for the total flashlight emission amount from the electronic flash intended by the photographer with respect to the correct exposure corresponding to the film speed of the film used with the camera and the aperture scale value set for the camera. This compensation signal generator circuit 26 sets a compensation light amount for separately compensating the flashlight emission amount of the electronic flash 200. The compensation signal generated from the compensation signal generator circuit 26 is used in the calculation of a desired flashlight emission amount in an interrupt signal generator circuit 25.

The electronic flash 200 includes input terminals 21 and 22 which are repspectively connected to the terminals 11 and 12 of the camera 100 by means for example of a synchro cord or the like. The interrupt signal generator circuit 25 receives from the camera side a synchro signal X and an external interrupt signal A via the input terminals 21 and 22, respectively, so that a desired flashlight emission amount is calculated in accordance with the integrated value of the light amount measured by the photometry circuit 24 during the time interval from the arrival of the synchro signal X and the compensation light amount set in the compensation signal generator circuit 26 and also an interrupt signal S is applied to a controller 23 when the integrated value of the light amount measured by the photometry circuit 24 from the time of the arrival of the synchro signal X reaches the desired flashlight emission amount.

When the synchro signal X from the sync signal generator circuit 10 of the camera is received through the input terminal 21, the controller 23 triggers the electronic flash unit 20 to initiate the flashlight emission of the Xenon discharge tube (not shown) in the unit. In addition, when the interrupt signal S is received from the interrupt signal generator circuit 25, the controller 23 interrupts the flashlight emission of the electronic flash unit 20.

The synchro signal X from the the sync signal generator circuit 10 is also applied to the interrupt signal generator circuit 25 and this determines the timing of initiaing the flashlight emission of the electronic flash unit 20. This interrupt signal generator circuit 25 may for example be formed by a one-chip microprocessor.

Figure 2:
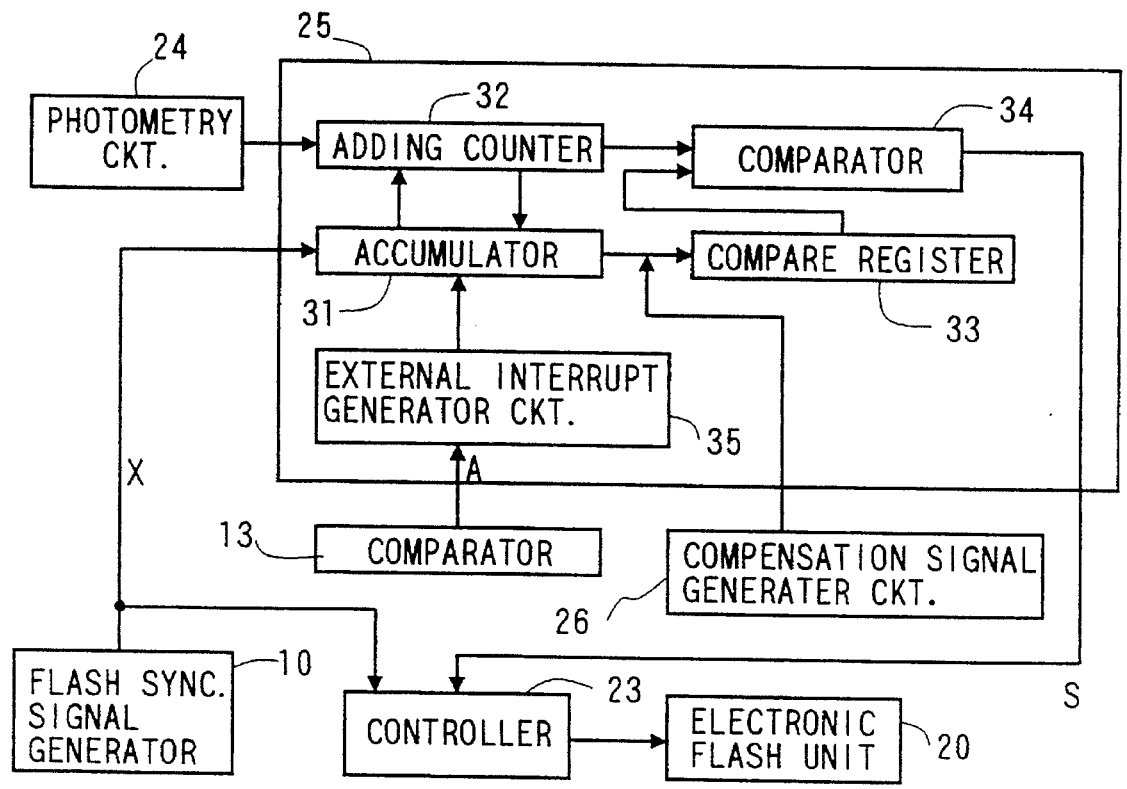
FIG. 2 is a block diagram showing an exemplary construction of principal parts of the interrupt signal generator circuit 25 in FIG. 1.

FIG. 2 shows an example of the construction of this interrupt signal generator circuit 25. In the Figure, the interrupt signal generator circuit 25 includes an adding counter 32 whose count source is the pulse signals from the I/F converter circuit 28 of the photometry circuit 24, and an accumulator 31 for controlling the operation of the counter 32. When the synchro signal X is not arriving from the sync signal generating circuit 10 of the camera, the accumulator 31 writes a "0" into the counter 32 and thus the counter 32 is reset. When the synchro signal X arrives at the accumulator 31, the counter 32 starts the counting of the pulse signals. When an interrupt signal A from the comparator circuit 13 of the camera is received via the external interrupt generator circuit 35, the accumulator 31 reads the count value of the counter 32.

Also, the interrupt signal generator circuit 25 includes a compare register 33 and a comparator 34. Simultaneously with the reading of the count value of the counter 32 in response to the arrival of the interrupt signal A as mentioned previously, the accumulator 31 writes into the compare register 33 a value produced by adding the compensation signal from the compensation signal generator circuit 26 to the count value of the counter 32 thus read out. Even during this time interval the counter 32 is continuously counting the pulse signals so that when the count value of the counter 32 becomes equal to the value written into the compare register 33, the comparator 34 applies an interrupt signal S as an internal interrupt signal to the controller 23.

The operations of the camera 100 and the electronic flash 200 will now be explained in due order. Prior to the start of photographing, when the synchro signal X from the sync signal generator circuit 10 is not arriving as yet, a "0" is repeatedly written into the counter 32 through the accumulator 31 and also a sufficiently large initial value, e.g., "$FFFF" is written into the compare register 32 in the event that the compare register 33 is of the 16-bit type. In this condition, an interrupt signal S as an internal interrupt signal has not been generated as yet.

Here, it is assumed that differing from the case of the conventional autoflash control, the reference signal generator 14 of the camera 100 which is connected to the electronic flash 200, generates a reference signal corresponding to a predetermined exposure which is on the underexposure side as compared with the correct exposure.

Under these present conditions, when a synchro signal X is generated from the sync signal generator 10 in response to the shutter operation of the camera 100, the controller 23 of the electronic flash 200 initiates the flashlight emission of the electronic flash unit 20. The flashlight emission amount of the electronic flash unit 20 thus initiated is measured by the photometry circuit 24 and pulse signals of a frequency proportional to the measured light amount are generated from the photometry circuit 24. At the same time, the amount of reflected light from an object to be photographed is measured by the TTL photometry circuit 15 on the camera 100 side and its integrated light amount value is applied to the comparator 13.

The comparator 13 generates an interrupt signal A when the integrated light amount of the reflected light from the object reaches the reference exposure set on the underexposure side relative to the correct exposure, that is, when the output of the TTL photometry circuit 15 coincides with the reference signal from the reference signal generator 14 and this interrupt signal A is applied to the interrupt signal generator circuit 25 of the electronic flash 200 through the terminals 12 and 22.

Figures 3A, 3B:
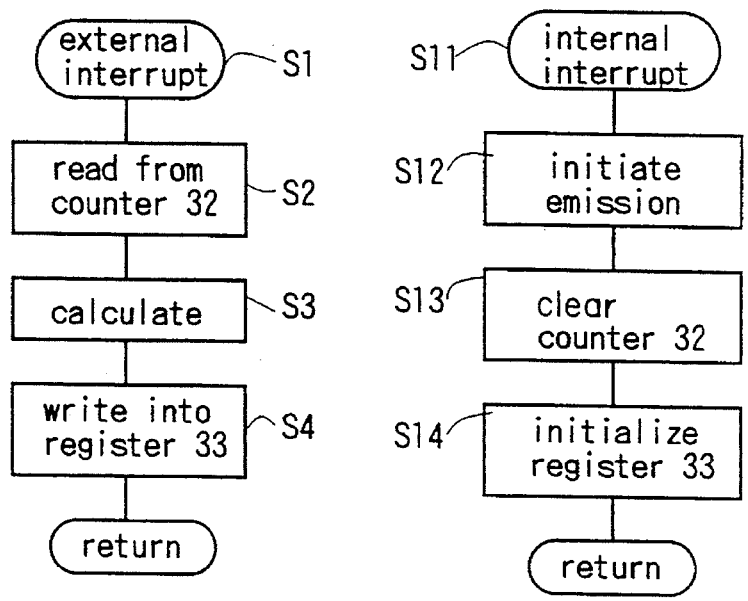
FIGS. 3a and 3b is a flow chart for the signal processing operation of the interrupt signal generating circuit.

FIG. 3a is a flow chart of an interruption processing routine which is started within the microcomputer of the interrupt signal generator circuit 25 when the external interrupt generator circuit 35 of the electronic flash 200 receives the interrupt signal A from the comparator 13. In the Figure, when the external interrupt generator circuit 35 receives the interrupt signal A from the comparator 13 of the camera at a step S1, the then current count value of the counter 32 is immediately read into the accumulator 31 (a step S2). The thus read-in value corresponds to the integrated flashlight emission amount produced from the electronic flash unit 20 during the time interval between the generation of the synchro signal X and the generation of the interrupt signal A.

Then, at a step S3, in accordance with the compensation light amount (the degrees for the aperture scale value) set in the compensation signal generator circuit 26 a calculation is performed to determine a desired flashlight emission amount. Then, a value CP corresponding to this desired flashlight emission amount is written into the compare register 33 at a step S4. The necessary computational expression for determining the value CP written into the compare register 33 is as follows $$CP = CO \cdot 2\exp(K-REF) \qquad (1)$$

where CO is the count value of the counter 32 at the time of the arrival of the interrupt signal A, K the exposure compensation value ($\pm 0$, $-1$, $-2$ ... ) set in the compensation signal generator circuit 26, and REF the reference exposure set in the reference signal generator 14 or the exposure compensation value indicating the number of degrees lowered from the exposure scale value corresponding to the correct exposure for the film speed of the film used.

In other words, in the present embodiment the value of REF is 0 or less, such as, $\pm 0$, $-1$, $-2$ or $-3$ and therefore the value left as a result of the subtraction of REF from K represents the exposure compensation value for continuing the flashlight emission. Therefore, the value of CO is given by the product of $2^{(K-REF)}$ and CO. It is to be noted that prior to photographing the value of REF is preliminarily set correspondingly in the electronic flash 200 along with the information of the film speed and the aperture scale value set in the camera 100.

For instance, where an exposure compensation value of ¼ times the correct exposure or "−2" is set as a preset exposure in the reference signal generator 14, an interrupt signal A is generated from the comparator 13 when the integrated flashlight emission amount of the electronic flash unit 20 from the time of the generation of a synchro signal X reaches a value corresponding to the EV "−2" relative to the correct exposure. If a compensation value "±0" is set in the compensation signal generator circuit 26 on the electronic flash 20 side, a light amount corresponding to the EV "2" or an additional amount of four times in light amount must be flashed continuously and therefore a value of four times the value CO of the counter 32 is written into the compare register 33. On the other hand, if, for example, the compensation value of the compensation signal generator circuit 26 is set to "−1", it is only necessary to continue the flashlight emission in an amount corresponding to the EV "1" or an amount of two times in light amount in addition to the TTL measured light amount corresponding to the exposure compensation value of "−2" set in the reference signal generator 14 and therefore a value of two times the value CO of the counter 32 is written into the compare register 33.

Figure 4:
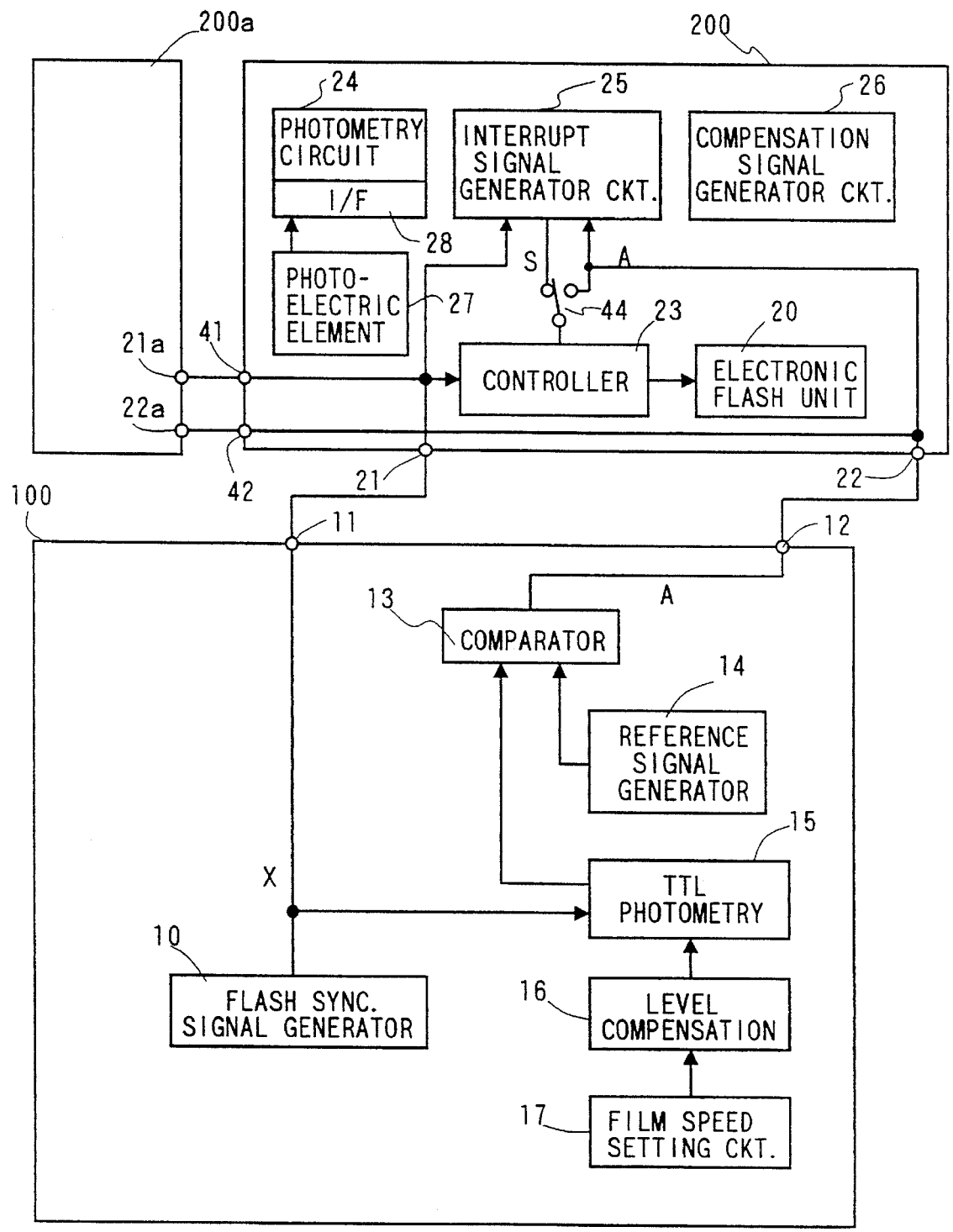
FIG. 4 is a block diagram showing the construction of principal parts of an electronic flash according to another embodiment of the present invention.

When, the above-mentioned series of operations have been completed, the flashlight emission interrupt processing routine shown in FIG. 3b is executed. In other words, under this condition the flashlight emission amount of the electronic flash unit 20, which has been continued since the arrival of the synchro signal X is continued even after the arrival of the interrupt signal A and therefore the pulse signals from the photometry circuit 24 are continuously applied to the counter 32. When the count value of the counter 32 reaches the value CP written into the compare register 33 at the time of the arrival of the interrupt signal A, an interrupt signal S is generated as an internal interrupt signal from the comparator 34 (a step S11). When the interrupt signal S is generated, the controller 23 interrupts immediately the flashlight emission of the electronic flash unit 20 (a step S12). Simultaneously, the counter 32 is cleared to "0" at a step S13 and the compare resigter 33 is initialized at a step S14, thereby returning the system to the initial state for the next photographing.

Where a plurality of electronic flashes are used to effect the multiple flashlight photography under a condition in which relative flashlight emission amounts are determined for the electronic flashes, another electronic flash or flashes of the same construction are added to the system. FIG. 4 shows a suitable modification for such purpose and the electronic flash 200 connected to the camera is provided with auxiliary output terminals 41 and 42 so that the synchro signal X and the interrupt signal A, which are respectively applied to its input terminals 21 and 22, are respectively supplied to the similar input terminals 21a and 22a of an additional electronic flash 200a. There auxiliary output terminals 41 and 42 are simply connected in parallel with the input terminals 21 and 22 so that if, for example, the additional electronic flash 200a is provided with the similar auxiliary output terminals, still another electronic flash or a third electronic flash (not shown) can be connected to the additional electronic flash 200a.

Where photographing is effected by using two or more electronic flashes of the same construction and the camera 100, in order that the amount of flashlight emission of each electronic flash may attain the desired proportion, a specific compensation value is set in the compensation signal generator circuit 26 of each of the electronic flashes. Thus, in this case the electronic flashes initiate the flashlight emission simultaneously at the same time that a synchro signal X is generated from the camera so that on and after the generation of an interrupt signal A from the camera, each of the electronic flashes continues its flashlight emission until the TTL measured light amount of the camera attains the desired flashlight emission amount peculiar to each electronic flash, thus successively causing the electronic flashes to stop the flashlight emission.

Even in the case of the conventional TTL autoflash system, the light emission control of the electronic flashes is effected in accordance with a synchro signal X from a camera and a stop signal from the TTL photometry system and this stop signal corresponds to the interrupt signal A when "±0" is set in the reference signal generator 14 of the present embodiment. Thus, a camera having the conventional TTL autoflash control function can be used as the camera 100 of the present embodiment without modifying its autoflash signal terminals.

It is to be noted that while, in the above-described embodiment, the reference signal generator 14 generates a reference signal corresponding to an exposure which is on the underexposure side as compared with the correct exposure so as to allow the comparator 13 to generate an interrupt signal A before the correct exposure is reached by the amount of light reflected from an object to be photographed and measured on the camera side, the present invention is not limited to such construction. For instance, even if a reference exposure corresponding to the correct exposure value is set in the reference signal generator 14 in the like manner as previously, it is possible to cause the TTL photometric level compensation circuit 16 to provide exposure compensation so as to increase the gain of the photosensitive amplifier in the TTL photometry circuit 15 by a predetermined amount so that an interrupt signal A is generated from the comparator 13 before the TTL measured light amount reaches the correct exposure value.

Also, the electronic flash of the present invention can be combined with an old-fashioned camera having no gain compensating function for the TTL photometry circuit. In this case, by preliminarily setting the TTL photometry circuit to an EV value which is on the negative side than the correct exposure value or by setting the film ISO speed to a higher film speed than that of the film used, it is possible to cause the comparator 13 to generate a signal equivalent to the interrupt signal A before the TTL measured light amount reaches the correct exposure value so that after the generation of this equivalent signal, the flashlight emission can be continued up to the desired flashlight emission amount in accordance with the compensation light amount set on the electronic flash side as in the case of the present embodiment.

Further, in order to accommodate cases where a single electronic flash is used or a plurality of electronic flashes are used without setting relative flashlight emission amounts, as shown in FIG. 4, a signal selector 44 is provided so that instead of the interrupt signal S, the interrupt signal A from the comparator 13 is selectively applied to the controller 23. In this case, the reference signal generator 14 of the camera is set so as to generate a reference signal corresponding to the correct exposure. In this way, the flashlight emission of all the electronic flashes can be stopped simultaneously when the correct exposure is attained in the TTL photometry circuit of the camera.

The present invention is not intended to be limited to the embodiments described above, and various changes and modifications which are obvious to those having the ordinary knowledge in the art come within the scope of the present invention in the light of the technical features stated in the appended claims.

What is claimed is:

1. An automatic light emission control system for controlling operation of at least one electronic flash connected to a camera, comprising:
   sync signal generator means for generating a first signal substantially synchronized with opening of a shutter of said camera
   first measuring means for generating a first measurement signal corresponding to an amount of reflected light from an object to be photographed illuminated by a flashlight emission of said electronic flash;
   reference signal generator means for generating a reference signal corresponding to a predetermined reference exposure;
   first comparator means for comparing said first measurement signal and said reference signal to generate a second signal when said amount of reflected light reaches said reference exposure;
   second measuring means for generating a second measurement signal corresponding to an amount of flashlight emission from said electronic flash;
   compensation signal generator means for generating a compensation signal corresponding to a predetermined compensation light amount for the flashlight emission amount of said electronic flash;
   means for determining a desired flashlight emission amount for said electronic flash in accordance with an integrated amount of said second measurement signal obtained during a time interval between a first time point of generation of said first signal and a second time point of generation of said second signal and said compensation light amount given by said compensation signal;
   second comparator means for generating a third signal when the integrated amount of said second measurement signal integrated from said first time point reaches said desired flashlight emission amount: and
   control means for initiating the flashlight emission of said electronic flash in response to the generation of said first signal and for interrupting the flashlight emission of said electronic flash in response to the generation of said third signal.

2. An automatic light emission control system according to claim 1, wherein said reference signal generator means generates said reference signal corresponding to said reference exposure set lower than a required correct exposure of said object to be photographed, and wherein said first comparator means generates said second signal before said amount of reflected light reaches said required correct exposure.

3. An automatic light emission control system according to claim 1, further comprising photometric level compensation means for compensating a gain of said first measuring means in such a manner that said first comparator means generates said second signal before the measured light amount by said first measuring means reaches the required correct exposure of said object to be photographed.

4. An automatic light emission control system according to claim 1, further comprising signal selector means for selectively applying one of said second signal and said third signal to said control means.

5. An automatic light emission control system for controlling operation of at least one electronic flash connected to a camera, said system comprising:
   sync signal generator means for generating a first signal substantially synchronized with opening of a shutter of said camera
   first measuring means responsive to the shutter opening operation of said camera to measure through a lens of said camera an amount of reflected light from an object to be photographed by said camera;
   reference signal generator means storing a plurality of preset reference exposures which are different from one another and lower than a required correct exposure value of said object to generate a signal corresponding to selected one of said plurality of reference exposures:
   comparator means for generating a second signal when said amount of reflected light measured by said first measuring means reaches said reference exposure selected by said reference signal generator means
   second measuring means for measuring an amount of flashlight emission from said electronic flash;
   compensation signal generator means for generating a compensation signal corresponding to a predetermined compensation light amount for the flashlight emission amount of said electronic flash;
   means for generating a third signal when an integrated value of said flashlight emission amount measured by said second measuring means from a time point of generation of said first signal reaches a desired flashlight emission amount determined in accordance with an integrated value of said flashlight emission amount measured by said second measuring means during a time interval between the generation of said first signal and the generation of said second signal and said compensation light amount; and
   control means for initiating the flashlight emission of said electronic flash in response to the generation of said first signal and for interrupting the flashlight emission of said electronic flash in response to the generation of said third signal.

6. An automatic light emission control system according claim 5, further comprising compensation means for compensating a gain of said first measuring means.

7. An automatic light emission control system according to claim 5, further comprising signal selector means for selectively applying one of said second signal and said third signal to said control means.

8. An electronic flash adapted to be connected to a camera which generates a first signal in synchronism with the opening of a shutter of said camera and generates a second signal when a measured value of an amount of reflected light from an object to be photographed reaches a predetermined exposure, said electronic flash comprising:
   flashlight emission means adapted to be electronically controlled to initiate and interrupt flashlight emission thereof;
   measuring means for measuring an amount of flashlight emission from said flashlight emission means;
   compensation amount setting adjuster means for setting a compensation light amount for the flashlight emission amount of said flashlight emission means;
   means for generating a third signal when an integrated value of the flashlight emission amount measured by said measuring means from a time point of the arrival of said first signal reaches a desired flashlight emission amount determined in accordance with an integrated value of the flashlight emission amount measured by said measuring means during a time interval between the arrival of said first signal and the arrival of said second signal and the compensation light amount set in said compensation amount setting adjuster means; and control means for initiating the flashlight emission of said flashlight emission means in response to the arrival of said first signal and for interrupting the flashlight emission of said flashlight emission means in response to the generation of said third signal.

9. An electronic flash according to claim 8, further comprising signal selector means for selectively applying one of said second signal and said third signal to said control means.

10. An electronic flash according to claim 8, further comprising terminals for outputting said first and third signals supplied from said camera to the outside for the connection of an additional electronic flash.

11. An electronic flash adapted to be connected to a camera which generates a first signal in synchronism with the opening of a shutter of said camera and generates a second signal when a measured value of an amount of reflected light from an object to be photographed reaches a predetermined exposure, said electronic flash comprising:

an electronic flash unit adapted to be electronically controllable for initiation and interruption of flashlight emission thereof;

a controller for initiating the flashlight emission of said electronic flash unit in response to the reception of said first signal and for interrupting the flashlight emission of said electronic flash unit in response to the reception of an interrupt signal;

a photometry circuit for measuring an amount of flashlight emision of said electronic flash unit;

a compensation signal setting adjuster for setting a compensation light amount for the flashlight emission amount of said electronic flash unit;

an interrupt signal generator circuit for applying said interrupt signal to said controller when an integrated value of said flashlight emission amount measured by said photometry circuit from a first time point of the arrival of said first signal reaches a desired flashlight emission amount determined in accordance with an integrated value of said flashlight emission amount measured during a time interval between said first time point and a second time point of the arrival of said second signal and the compensation light amount set in said compensation signal setting adjuster.

12. An electronic flash according to claim 11, wherein said interrupt signal generator circuit comprises:

a counter for counting an integrated value of said flashlight emission amount measured by said photometry circuit from the first time point of the arrival of said first signal a register for reading in an integrated value of said flashlight emission amount stored in said counter during a time interval between said first time point and the second time point of the generation of said second signal and the compensation light amount value set in said compensation signal setting adjuster at said second time point and storing a desired flashlight emission amount determined in accordance with said integrated value and said compensation light amount value; and a comparator for outputting said interrupt signal when an integrated value of said flashlight emission amount stored in said counter from said first time point reaches said desired flashlight emission amount stored in said register.

13. An electronic flash according to claim 11, further comprising terminals for outputting said first and second signals supplied from said camera to the outside for the connection of an additional electronic flash.

* * * * *